United States Patent
Cao

(10) Patent No.: US 10,440,626 B2
(45) Date of Patent: Oct. 8, 2019

(54) CONTENT-AWARE INTER-RAT RAB STEERING

(71) Applicant: Parallel Wireless, Inc., Nashua, NH (US)

(72) Inventor: Yang Cao, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 15/076,644

(22) Filed: Mar. 21, 2016

(65) Prior Publication Data

US 2016/0277992 A1  Sep. 22, 2016

Related U.S. Application Data

(60) Provisional application No. 62/135,984, filed on Mar. 20, 2015.

(51) Int. Cl.
| | |
|---|---|
| *H04W 36/38* | (2009.01) |
| *H04J 11/00* | (2006.01) |
| *H04W 76/27* | (2018.01) |
| *H04W 48/18* | (2009.01) |
| *H04W 28/02* | (2009.01) |
| *H04W 88/10* | (2009.01) |

(Continued)

(52) U.S. Cl.
CPC ............ *H04W 36/38* (2013.01); *H04J 11/00* (2013.01); *H04W 28/0284* (2013.01); *H04W 48/18* (2013.01); *H04W 76/27* (2018.02); *H04W 28/08* (2013.01); *H04W 36/06* (2013.01); *H04W 36/14* (2013.01); *H04W 36/22* (2013.01); *H04W 76/50* (2018.02); *H04W 88/06* (2013.01); *H04W 88/10* (2013.01)

(58) Field of Classification Search
CPC ..... H04W 36/38; H04W 76/04; H04W 72/08; H04W 72/04; H04W 88/10; H04J 11/00
See application file for complete search history.

(56) References Cited

U.S. PATENT DOCUMENTS

| 7,224,977 B2 | 5/2007 | Cavalli et al. |
| 8,838,089 B2 | 9/2014 | Wu |

(Continued)

FOREIGN PATENT DOCUMENTS

| EP | 1654625 B1 | 5/2006 |
| WO | 2016083524 A1 | 6/2016 |

OTHER PUBLICATIONS

"Mobile Broadband for All," Ericsson, Ericsson White Paper, Uen 284 23-3195 Rev B, Mar. 2015, retrieved from http://www.ericsson.com/res/docs/whitepapers/mobile-broadband-for-all.pdf.

(Continued)

*Primary Examiner* — Xavier Szewai Wong
(74) *Attorney, Agent, or Firm* — Michael Y. Saji; David W. Rouille

(57) ABSTRACT

A method for congestion control at an eNodeB is described, comprising detecting congestion at an eNodeB and entering a congestion control mode, receiving, at the eNodeB, a new user equipment (UE) connection request that contains a radio resource control (RRC) establishment cause, and using the RRC establishment cause for identifying a congestion management strategy, the congestion management strategy comprising one of initiating a handover for an existing LTE bearer, or redirecting the new UE connection request to a 3G nodeB.

15 Claims, 5 Drawing Sheets

(51) Int. Cl.
| | |
|---|---|
| H04W 88/06 | (2009.01) |
| H04W 76/50 | (2018.01) |
| H04W 36/06 | (2009.01) |
| H04W 36/14 | (2009.01) |
| H04W 36/22 | (2009.01) |
| H04W 28/08 | (2009.01) |

(56) References Cited

U.S. PATENT DOCUMENTS

| | | | |
|---|---|---|---|
| 9,107,092 B2 | 8/2015 | Agarwal et al. | |
| 9,198,211 B2 | 11/2015 | Fodor et al. | |
| 9,445,425 B2* | 9/2016 | Chapman | H04W 16/14 |
| 9,723,030 B2* | 8/2017 | Hedman | H04W 36/0022 |
| 2003/0048791 A1 | 3/2003 | De Cnodder et al. | |
| 2004/0082328 A1 | 4/2004 | Japenga et al. | |
| 2006/0133272 A1 | 6/2006 | Yuan et al. | |
| 2007/0213059 A1* | 9/2007 | Shaheen | H04W 36/0033 455/436 |
| 2008/0075003 A1 | 3/2008 | Lee et al. | |
| 2010/0005178 A1 | 1/2010 | Sindelaru et al. | |
| 2010/0130205 A1 | 5/2010 | Jung et al. | |
| 2010/0329210 A1 | 12/2010 | Shirota et al. | |
| 2011/0275359 A1* | 11/2011 | Sebire | H04L 5/001 455/422.1 |
| 2011/0305220 A1* | 12/2011 | Lindoff | H04W 28/26 370/331 |
| 2012/0135731 A1 | 5/2012 | Rangaiah et al. | |
| 2013/0072146 A1 | 3/2013 | Smith | |
| 2013/0083678 A1* | 4/2013 | Yin | H04L 43/08 370/252 |
| 2013/0188499 A1 | 7/2013 | Mach et al. | |
| 2013/0237223 A1 | 9/2013 | Hietalahti et al. | |
| 2013/0329567 A1 | 12/2013 | Mathias et al. | |
| 2013/0329583 A1* | 12/2013 | Vrzic | H04W 36/30 370/252 |
| 2014/0016614 A1* | 1/2014 | Velev | H04W 4/70 370/331 |
| 2014/0022978 A1* | 1/2014 | Chen | H04W 72/085 370/312 |
| 2014/0064156 A1 | 3/2014 | Paladugu et al. | |
| 2015/0103755 A1 | 4/2015 | Cui et al. | |
| 2015/0141011 A1* | 5/2015 | Jeong | H04W 8/02 455/435.3 |
| 2015/0271087 A1* | 9/2015 | Yiu | H04L 47/35 370/230 |
| 2015/0282010 A1 | 10/2015 | Yang et al. | |
| 2016/0044545 A1 | 2/2016 | Yang et al. | |
| 2016/0073312 A1 | 3/2016 | Sridhar | |
| 2016/0157253 A1* | 6/2016 | Yamine | H04W 4/90 455/456.2 |
| 2016/0174106 A1* | 6/2016 | Lee | H04W 40/20 705/14.63 |
| 2016/0277991 A1 | 9/2016 | Yang et al. | |
| 2016/0295614 A1 | 10/2016 | Lee et al. | |
| 2017/0013513 A1 | 1/2017 | Agarwal et al. | |
| 2017/0164238 A1* | 6/2017 | Paredes Cabrera | H04W 28/12 |
| 2017/0208501 A1 | 7/2017 | Lee et al. | |
| 2018/0027460 A1 | 1/2018 | Zhang | |

OTHER PUBLICATIONS

3rd Generation Partnership Project, 3GPP TS 24.301 v12.7.0 (Dec. 2014), "3rd Generation Partnership Project; Technical Specification Group Core Network and Terminals; Non-Access-Stratum (NAS) Protocol for Evolved Packet System (EPS); Stage 3 (Release 12)," 3rd Generation Partnership Project, Dec. 2014, V12.7.0, pp. 349-352.

Chris Johnson, "23.1 RRC Connection Establishment," Long Term Evolution (LTE) in Bullets, retrieved from http://lte-bullets.com/LTE%20in%20Bullets%20-%20RRC%20Establishment.pdf.

"IMS Procedures and Protocols | The LTE User Equipment Perspective," Spirent Communications, retrieved from hittp://www.spirent.com/~/media/White%20Papers/Mobile/Protocol_Reference_Guide.pdf.

"Quality of Service in LTE," Sandvine—Intelligent Broadband Networks, Sep. 21, 2014, retrieved from https://www.sandvine.com/downloads/general/whitepapers/quality-of-service-in-lte-long-form.pdf.

3rd Generation Partnership Project, 3GPP TS 23.203 v13.2.0 (Dec. 2014), "3rd Generation Partnership Project; Technical Specification Group Services and System Aspects; Policy and Charging Control Architecture (Release 13)," 3rd Generation Partnership Project, Dec. 2014, V13.2.0.

European Telecommunications Standards Institute, ETSI TS 124 301 V10.3.0 (Jun. 2011) "Universal Mobile Telecommunications System (UMTS); LTE; Non-Access-Stratum (NAS) protocol for Evolved Packet System (EPS); Stage 3 (3GPP TS 24.301 Version 10.10 Release 10)" Version 10.3.0, Jun. 2011.

* cited by examiner

CONTENT-AWARE INTER-RAT RAB STEERING

CROSS-REFERENCE TO RELATED APPLICATIONS

This application claims the benefit of priority under 35 U.S.C. § 119(e) of U.S. Provisional Patent Application No. 62/135,984, filed on Mar. 20, 2015 and entitled "Content Aware Inter-RAT RAB Steering," which is hereby incorporated by reference in its entirety for all purposes. The present application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. patent application Ser. No. 14/034,915, "Dynamic Multi-Access Wireless Network Virtualization," filed Sep. 24, 2013; U.S. patent application Ser. No. 14/510,074, "Parameter Optimization and Event Prediction Based on Cell Heuristics," filed Oct. 8, 2014; U.S. patent application Ser. No. 14/642,544, "Federated X2 Gateway," filed Mar. 9, 2015; U.S. patent application Ser. No. 14/828,432, "Inter-Cell Interference Mitigation," filed Aug. 17, 2015; U.S. patent application Ser. No. 14/936,267, "Self-Calibrating and Self-Adjusting Network," filed Nov. 9, 2015; U.S. patent application Ser. No. 15/002,383, "Multi-Rat Heterogeneous Carrier Aggregation," filed Jan. 20, 2016; U.S. patent application Ser. No. 14/942,950, "Seamless Mobile Handover," filed Nov. 16, 2015; and U.S. Provisional Pat. App. No. 62/310,173, "IuGW Architecture," filed Mar. 18, 2016, each in its entirety for all purposes, respectively.

BACKGROUND

Presently, Long Term Evolution (LTE), a 4G standard, and the Universal Mobile Telecommunications System (UMTS), a 3G standard, along with other 3G and 4G standards, coexist in the marketplace and in mobile operator deployments. It is anticipated that this coexistence will continue for some time, including the period during which both are in active use as well as the period during which 3G is phased out. A way to use both 3G and 4G resources productively, such as during congestion periods, is therefore desirable.

The present disclosure describes systems and methods for performing steering, i.e., direction and/or redirection, of a UE or a radio access bearer (RAB) from one radio access technology (RAT) to another, including from 3G to 4G and from 4G to 3G, thereby providing congestion relief. Specific parameters and strategies are described therefor.

SUMMARY

A method is disclosed, comprising: detecting congestion at an eNodeB and entering a congestion control mode; receiving, at the eNodeB, a new user equipment (UE) connection request that contains a radio resource control (RRC) establishment cause; using the RRC establishment cause for identifying a congestion management strategy, the congestion management strategy comprising one of initiating a handover for an existing LTE bearer, or redirecting the new UE connection request to a 3G nodeB. The method further involves wherein detecting congestion at the eNodeB is performed at the eNodeB. The method further involves wherein detecting congestion at the eNodeB is performed at a coordinating server. The method further involves wherein the eNodeB is a multi-radio access technology (multi-RAT) eNodeB with an integrated UMTS nodeB. The method further involves further comprising using a quality of service class identifier (QCI) of the existing LTE bearer to determine whether to evacuate the existing LTE bearer. The method further involves wherein the congestion management strategy comprises both of initiating a handover for an existing LTE bearer, and redirecting the new UE connection request to a 3G nodeB. The method further involves wherein the congestion management strategy comprises initiating a handover for an existing LTE bearer if the new UE connection request has an RRC establishment cause of either emergency or high priority access. The method further involves further comprising redirecting the new UE connection request that is a request for a packet-switched (PS) data connection to a 3G nodeB. The method further involves further comprising redirecting a mobile originating data connection request to a 3G nodeB. The method further involves further comprising identifying a plurality of LTE bearers to be handed over to 3G from lowest to highest QCI value. The method further involves further comprising exiting the congestion control mode once congestion at the eNodeB is resolved. The method further involves further comprising redirecting 3G connections back to the LTE eNodeB once congestion at the eNodeB is resolved. The method further involves further comprising detecting congestion by tracking one or more of: processor load; physical resource block (PRB) usage; physical downlink control channel control channel elements (PDCCH CCEs); number of total user equipments served; and backhaul bandwidth utilization.

A system is also disclosed comprising a multi-radio access technology (multi-RAT) base station comprising: a Long Term Evolution (LTE) eNodeB; a High Speed Packet Access (HSPA) nodeB coupled to the LTE eNodeB; and a multi-RAT coordination module coupled to the LTE eNodeB and the HSPA nodeB, the multi-RAT coordination module configured to perform steps comprising: detecting congestion at an eNodeB and entering a congestion control mode; receiving, at the eNodeB, a new user equipment (UE) connection request that contains a radio resource control (RRC) establishment cause; using the RRC establishment cause for identifying a congestion management strategy, the congestion management strategy comprising one of initiating a handover for an existing LTE bearer, or redirecting the new UE connection request to a 3G nodeB.

A digital storage medium is also disclosed comprising instructions that, when executed by a base station, causes the computer to perform steps comprising: detecting congestion at an eNodeB and entering a congestion control mode; receiving, at the eNodeB, a new user equipment (UE) connection request that contains a radio resource control (RRC) establishment cause; using the RRC establishment cause for identifying a congestion management strategy, the congestion management strategy comprising one of initiating a handover for an existing LTE bearer, or redirecting the new UE connection request to a 3G nodeB.

DETAILED DESCRIPTION

Figure 1:
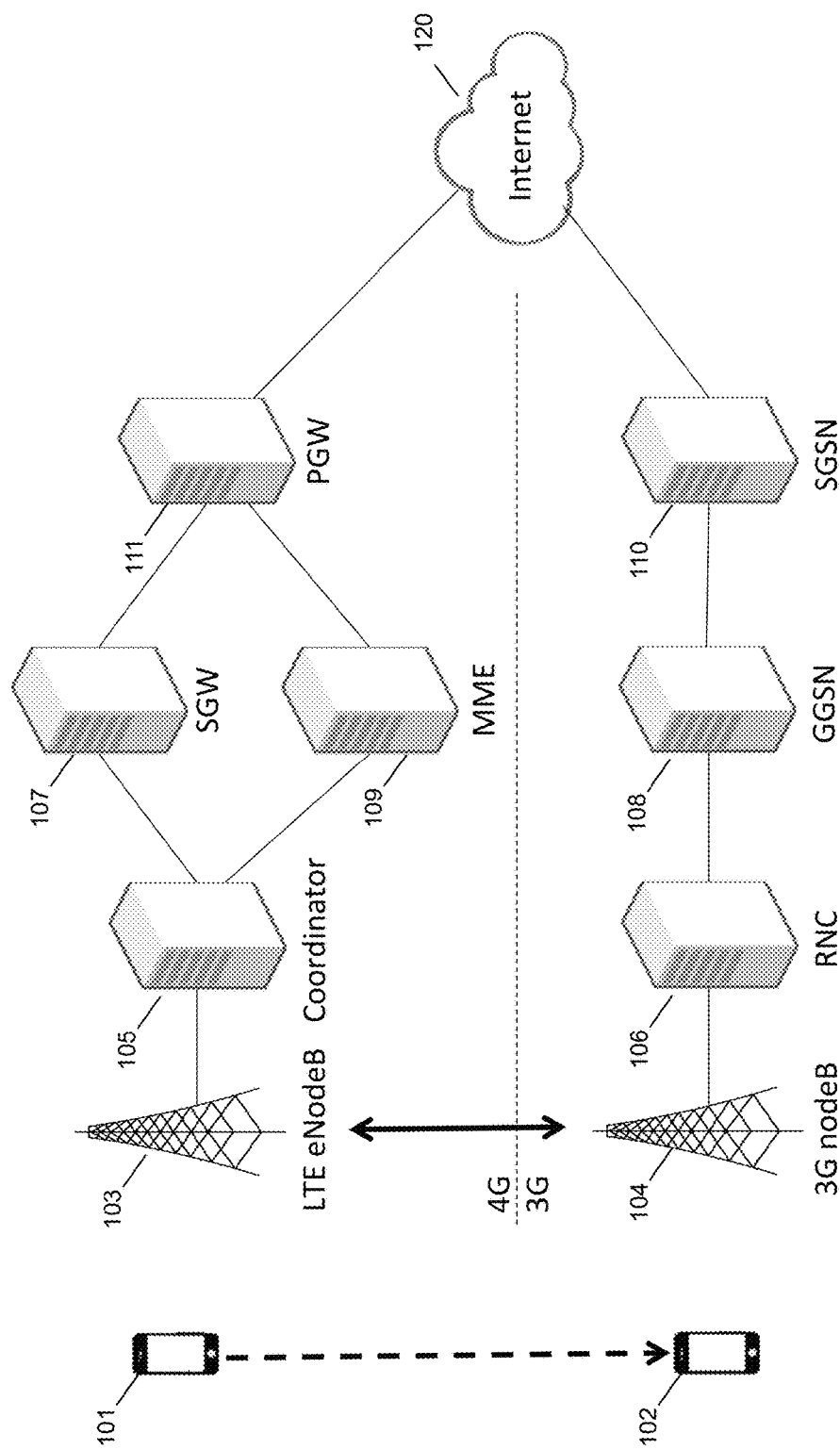
FIG. 1 is a schematic diagram of a system providing multi-RAT service, according to some embodiments.

The assumptions made regarding the below disclosure include: a UE that is capable of 3G and 4G network access; 3G and 4G coverage over the same area; and a inter-RAT RAN coordination mechanism, such as described within U.S. Pat. App. Pub. US 20140126410, incorporated by reference herein in its entirety for all purposes.

In the 3G/4G co-deployment context, the typical default UE behavior is camping on or attaching to the 4G RAN preferentially over attaching to the 3G RAN, which may lead to 4G RAN congestion during peak hours. During such peak hours, ideally traffic could be steered to the least loaded RAT, leading to better performance. Here the service/content aspect should also be taken into account (content-aware steering), so that services that benefit most from LTE could use LTE, while less-demanding services could use 3G (R99/HSPA/HSPA+).

This method provides congestion control based on inter-RAT steering, as well as LTE-3G offload.

In the LTE system, a UE in idle mode establishes a Radio Resource Control (RRC) connection for signaling or data transmission. The UE sends an RRC connection request message including an RRC connection establishment cause to an eNB to request to establish an RRC connection. The eNodeB uses the RRC connection establishment cause to prioritize the RRC connection request from the UE, e.g. at high load situations. Therefore, the UE has to include the correct RRC connection establishment cause for the eNodeB to prioritize the RRC connection establishment. Currently, in the LTE system, RRC connection establishment causes are defined as follows: emergency call, high priority access, Mobile Terminating (MT) access, Mobile Originating (MO) signaling and MO data. The RRC establishment cause is sent as an information element (IE) that is part of the RRC connection request.

These RRC connection establishment causes are mainly used by the network to differentiate the subsequent action upon receiving the RRC connection request message. For example, the RRC connection establishment cause can be used to perform call admission control, or to perform access barring control to prioritize access of Non Access Stratum (NAS) connection request types, which are mapped to RRC connection establishment causes. RRC connection establishment causes may be UEs are typically maintained in one of two modes, an idle mode and a connected mode. This is true for UMTS/3G and also for LTE. The idle mode is lower power and does not require the base station to be connected. The connected mode requires greater resource commitment from the base station. Base stations or UEs may request that a UE be moved from one base station to another. Cell reselection happens from idle mode to idle mode (i.e. is an idle mode procedure) and is not covered further here. While in the connected mode, the base station may request a UE to attach to another base station; this is called handover. This may be an intra-radio access technology (intra-RAT) handover, to another base station of the same RAT, or an inter-RAT handover, e.g., from 4G to 3G, from LTE RRC_CONNECTED to 3G RRC_CONNECTED/CELL_DCH, or vice versa.

Redirection is a third type of procedure in which the active base station moves the UE from connected mode to idle mode (e.g. in many cases for circuit-switched fallback (CSFB), the UE is redirected from LTE RRC_CONNECTED mode to 2G/3G idle mode). For example, in case of CSFB, handover is not required or even supported by the network and/or the UE, because 4G and 3G do not have a mechanism for directly handing off active data flows, and in such case redirection is de facto the only possible mechanism to use. With redirection, although specific data flows are not handed off, information such as frequencies of the target base station may be included along with the redirection request.

Typically, LTE eNodeBs perform CSFB because support for voice connections over LTE has only recently become available using Voice over LTE (VoLTE). However, it is possible to use the same type of redirect not only just for circuit-switched calls, but for packet connections as well; and to use this type of redirect to manage congestion, as well as to redirect UEs to other nodes with voice call capability.

Redirection can be faster than handover due to many reasons (e.g. inter-RAT measurement delay/cell detection, L3 filtering, time-to-trigger, handover preparation in the network etc.), especially in cases where a mobile-originated (MO) or mobile-terminated (MT) call that requires the UE to move to RRC_CONNECTED state and perform CSFB is triggered from LTE idle mode.

One advantage of redirect over handover is that handover requests may include obtaining measurement reports from UEs, such as from UEs from neighboring cells or by the source eNodeB requesting that a UE provide specific inter-RAT measurement reports, which delays completion of the handover. But a redirect does not require any measurement reports, since the redirect requires only a target frequency to be indicated, and thus the redirect completes sooner than a handover. Redirection is supported in Release 8 and above UEs.

Packet and circuit redirect requests may be marked differently. For redirect requests that are made for circuit-switched fallback (CSFB), the redirect request may be marked with a flag indicating that this is a CS-protocol redirect request. For redirects for packet-switched data connections, the redirect request may be marked with a PS flag.

RRC connection establishment is used to make the transition from RRC Idle mode to RRC Connected mode. UE must make the transition to RRC Connected mode before transferring any application data, or completing any signaling procedures. The RRC connection establishment procedure is always initiated by the UE but can be triggered by either the UE or the network. For example, the UE triggers RRC connection establishment if the end-user starts an application to browse the internet, or to send an email. Similarly, the UE triggers RRC connection establishment if the UE moves into a new Tracking Area and has to complete the Tracking Area Update signalling procedure. The network triggers the RRC connection establishment procedure by sending a Paging message. This could be used to allow the delivery of an incoming SMS or notification of an incoming voice call.

In some embodiments described herein, a method similar to CSFB may be used to cause RRC connection establishment in LTE to be redirected to establishment of a connection to a 3G node.

LTE congestion may be caused by any of various reasons. In some embodiments, an enhanced base station may maintain one or more congestion detection key performance indicators (KPIs):

1. RRC failure due to lack of resource, such as physical resource blocks (PRBs) being used up 2. Running out of physical downlink control channel (PDCCH) control channel elements (CCEs)

3. Exceeding limit on total # of UEs to be served concurrently

4. Exceeding limit on total # of UEs to be served within one transmit time interval (TTI)

5. Backhaul resource used up (i.e., out of upstream bandwidth for servicing the UE)

6. Processing resources used up or at high load

When one or more of the congestion KPIs is reached, reaches a high level, or exceeds a congestion threshold, the system could enter into a congestion management mode and could use the methods described herein. Congestion could be detected either at a cloud coordination server, such as an LTE access controller, or at a base station.

Once congestion is detected (or the onset of congestion is detected), one of more of the following actions can be taken:

1. During the new RRC connection stage, the RRC establishment cause may be taken into account. RRC establishment causes are sent by a UE during the connection request. The possible causes include: emergency; high priority access; mobile terminating access; mobile originating signaling; and mobile originating data. This set of different causes can provide bases to provide different actions under the congestion scenario.

2. If the causes are emergency or high priority access:

a. As long as 3G RAN still has enough capacity (not experiencing congestion concurrently), identify the established LTE PDP contexts based on QCI info.

It is possible to perform redirection of existing LTE bearers by using the bearer quality of service (QoS) class identifier (QCI) field associated with the bearer. The QCI field is created at the eNodeB and is therefore readily available, even with encrypted traffic. The following table describes the QCI values that are available as defined in 3GPP TS 23.203, "Policy and Charging Control Architecture":

As described herein, bearers are tagged with QCI based on the type of traffic that is understood to be transmitted over that bearer. QCI is typically used to discard low-priority traffic according to priority, from lowest priority to highest priority. In some embodiments, QCI may be used to identify bearers, and then to cause the bearers to be redirected or handed over to other cells, such as a 3G cell.

b. Deflecting some E-RABs into the 3G via inter-RAT handover (ranked based on QCI preferences)

In some cases, capacity for new calls may require that existing bearers be dropped. When a 3G packet nodeB is available, redirection of bearers to the 3G nodeB is a good solution. Bearers may be redirected, causing them to return to IDLE mode, but since packet traffic is often non-interactive (i.e., not a real-time voice or video call), no interruption is necessarily required of the user, and the inconvenience to the user may thus be kept to a minimum.

i. QCI=1 is deflected 1st (ideally towards R99)

ii. QCI=9 is deflected to 3G best-effort c. Proceed to the RRC connection for the current connections 3. If the causes are Mobile Originating Calls, identified via the RRC establishment cause and a domain indicator flag set to CS, it may be possible to try an optimized CSFB approach: reject the current RRC connection request and redirect it to the 3G domain. Note that this scheme can be exercised during the non-congestion state as well.

4. Otherwise, for example in the cases of MO signaling or MO data, redirect packet-switched inbound RRC connections to the 3G RAT by issuing RRC connection release with the specified 3G cell's frequency info, etc. By redirecting these connections, the LTE eNodeB that is congested will be able to continue handling its current load of bearers without becoming increasingly congested.

TABLE 1

QCI

| QCI | Resource Type | Priority | Packet Delay Budget | Packet Error Loss | Example Services |
|---|---|---|---|---|---|
| 1 | GBR (guaranteed bit rate) | 2 | 100 ms | 10-2 | Conversational Voice |
| 2 | GBR | 4 | 150 ms | 10-3 | Conversational Video |
| 3 | GBR | 3 | 50 ms | 10-3 | Real Time Gaming |
| 4 | GBR | 5 | 300 ms | 10-6 | Non-Conversational Video (Buffered Streaming) |
| 65 | GBR | 0.7 | 75 ms | 10-2 | Mission Critical user plane Push To Talk voice (e.g., MCPTT) |
| 66 | GBR | 2 | 100 ms | 10-2 | Non-Mission-Critical user plane Push To Talk voice |
| 5 | non-GBR | 1 | 100 ms | 10-6 | IMS Signalling |
| 6 | non-GBR | 6 | 300 ms | 10-6 | Video (Buffered Streaming) TCP-Based (for example, www, email, chat, ftp, p2p and the like) |
| 7 | non-GBR | 7 | 100 ms | 10-3 | Voice, Video (Live Streaming), Interactive Gaming |
| 8 | non-GBR | 8 | 300 ms | 10-6 | Video (Buffered Streaming) TCP-Based (for example, www, email, chat, ftp, p2p and the like) |
| 9 | non-GBR | 9 | 300 ms | 10-6 | Video (Buffered Streaming) TCP-Based (for example, www, email, chat, ftp, p2p and the like). Typically used as default bearer |
| 69 | non-GBR | 0.5 | 60 ms | 10-6 | Mission Critical delay sensitive signalling (e.g., MC-PTT signalling) |
| 70 | non-GBR | 5.5 | 200 ms | 10-6 | Mission Critical Data (e.g. example services are the same as QCI 6/8/9) |

5. In some embodiments, it is possible to cause packet-switched LTE bearers that are already on the eNodeB to be reselected to a 3G RAT, just as described in step 4, but for currently-active bearers and not just for new inbound RRC requestors.

Note that this process is reversible. Once the LTE congestion status is cleared, a set of 3G connections can be shifted back to LTE (via inter-RAT handover). Given that 3G often offers superior characteristics for voice calls, QCI=1 bearers would stay in the 3G domain to provide a better and more economical fit.

The steps described herein could be completed or initiated in a different order. Steps could be omitted, or one or more steps could be performed individually, or could be applied only to a subset of bearers or incoming attach requests. For example, special treatment may be applied only to circuit-switched calls and not to packet data or vice versa.

The method described herein is robust even when encryption is used. In the LTE protocol, data is encrypted between the eNodeB and the remote endpoint. This results in the situation where quality of service information that is within the encrypted tunnel is not known to the intermediary nodes, causing intermediary nodes to be unable to apply quality of service to the encrypted traffic. For example, signaling traffic to a management system that is encrypted in the HTTPS protocol may not be given priority service if it is necessary to look within the encrypted HTTPS data payload. However, the method described herein uses the RRC establishment cause, which is not encrypted, and the QCI of preexisting bearers, which is also not encrypted. Both these QoS flags are information elements associated with the bearer envelope itself, and thus are available at the eNodeB for inspection.

The above disclosure relates to the network-driven scenario. In some embodiments and use cases, the UE can also perform idle-reselection. If the LTE E-UTRAN is not congested, the re-selection into the LTE typically could be accepted. But during the congestion scenario, by default, re-selection may be rejected, hence re-directing back to the 3G domain. We can improve this behavior using the specific UE's history profile, tracked for example by IMSI, by which we can predict that this UE's typical QCI pattern is tied with video traffic etc. In such cases, we could consider deflecting some of the existing E-RABs (QCI=1) into the 3G network to make room for such LTE re-selection access.

In further embodiments, offload from 3G to LTE is also understood to be possible using at least the same parameters described above. For example, if a UE is capable of LTE as well as 3G, the UE may be steered to LTE when capacity is not available on 3G. Steering could also be reverted back by the network, for instance, when capacity later becomes available.

In some embodiments, handover as well as redirect could be used for network-controlled steering. In some embodiments, proactive steering could reduce the likelihood of congestion before congestion occurs. In some embodiments, non-congestion-related steering could also be used. For example, different RANs may have different backhaul characteristics. Steering according to this disclosure may be used to steer voice calls toward the RAN with better backhaul characteristics for voice calls, such as low latency, while steering noninteractive packet data toward another RAN. In some embodiments, multiple RANs may be used for redirection, with the specific target RAN being identified by its frequency, in the case that multiple frequencies are available for providing access.

FIG. 1 is a schematic diagram of a system providing multi-RAT service, according to some embodiments. UE 101 is connected to LTE eNodeB 103. The LTE eNodeB 103 is connected to a coordinating gateway 106, which may provide functions such as: self-organizing or self-healing network properties; cached or virtualized core network functions; multi-operator core network (MOCN) capabilities; eNodeB virtualization; multi-RAT coordination; load coordination with other eNodeBs or other nodeBs; or other functions. In addition, coordinating gateway 106 provides a gateway to a serving gateway (SGW) 107 and a packet gateway (PGW) 111 and a mobility management entity (MME) 109, which are well-known aspects of an evolved packet core (EPC) network that provide packet serving, gateway functions to other networks, and mobility management functions. The PGW 111 provides gateway functionality to the public Internet 120. These components constitute a 4G access network and core network.

As well, FIG. 1 shows a 3G nodeB 104, which is connected to a radio network controller (RNC) 106, as well as a gateway GPRS support node (GGSN) 108 and serving GPRS support node (SGSN) 110, which constitute a 3G (UMTS) access network and core network. The SGSN provides gateway functionality to the Internet 120.

As shown, UE 101 may be redirected from LTE eNodeB 103 to 3G nodeB 104 (the post-redirection UE being represented as UE 102). LTE eNodeB 103 and 3G nodeB 104 may, in some embodiments, communicate to share information regarding availability, congestion, and load. In some embodiments, load information may be deduced at either eNodeB 103 or nodeB 104 indirectly from measurement reports received by the eNodeB or nodeB from UEs in the area. In some embodiments, base stations 103 and 104 may communicate directly via a mesh link, or via Internet 120 and their respective core networks.

Figure 4:
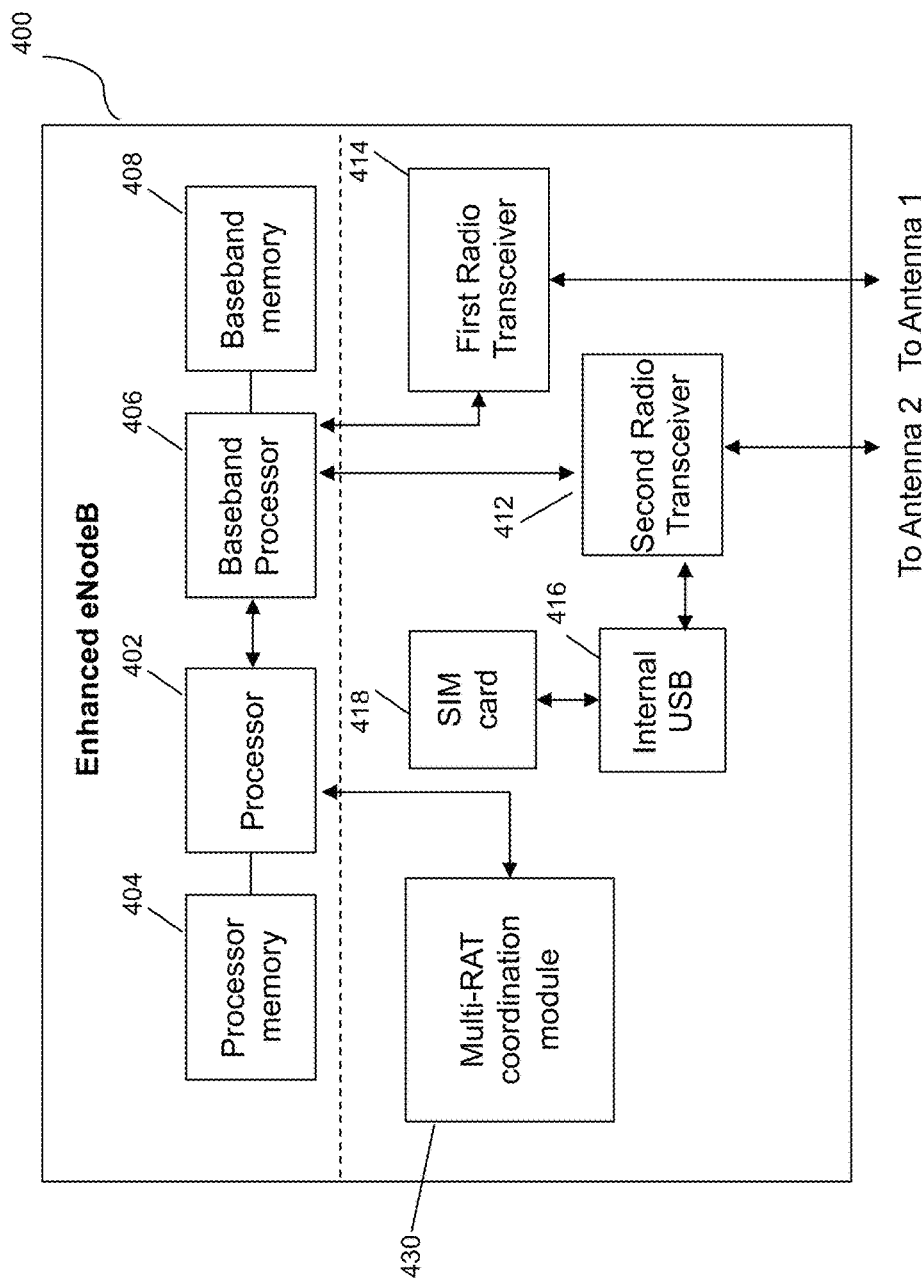
FIG. 4 is a schematic diagram of an enhanced eNodeB, in accordance with some embodiments.

In some embodiments, LTE eNodeB 103 and 3G nodeB 104 may be located in the same device, such as in a single multi-RAT base station as shown in FIG. 4. In the case that both base stations are located in the same device, the communication between them may be further optimized, for example by using shared memory, shared file systems, inter-process communication, loopback or local network communications, or other means. In some embodiments, 3G core 106, 108, 110 may be emulated by coordinator 105 such that the LTE core network is leveraged to provide all necessary support for the UE, while the UE is still enabled to connect to a 3G RAN via nodeB 104.

Figure 2:
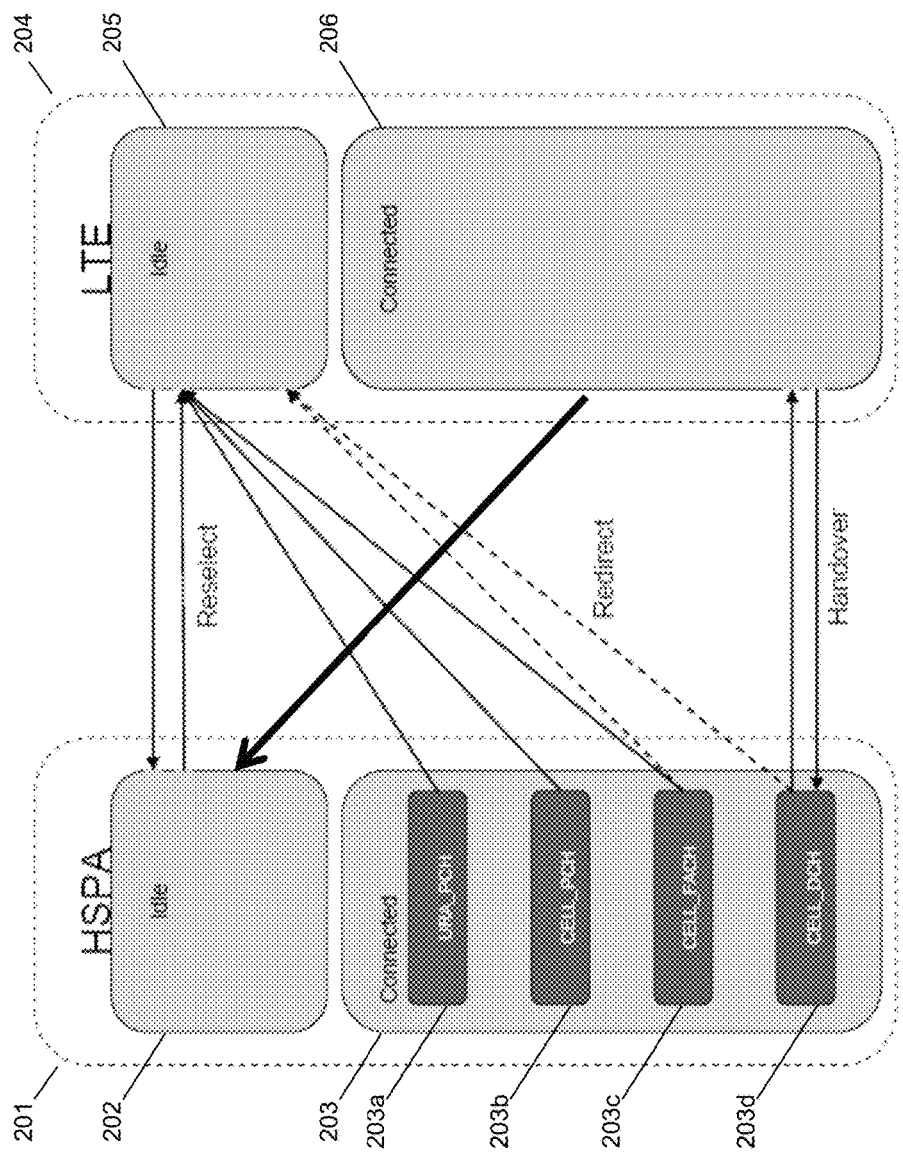
FIG. 2 is a state diagram showing multiple states of an HSPA and an LTE protocol stack at a HSPA base station and an LTE base station, in accordance with some embodiments.

FIG. 2 is a state diagram showing multiple states of an HSPA and an LTE protocol stack at a HSPA base station and an LTE base station, in accordance with some embodiments. High speed packet access (HSPA, e.g., 3G) protocol UE connection states 201 include idle 202 and connected 303. The HSPA connected state 203 has several sub-states, namely, 203a (URA_PCH), 203b (CELL_PCH), 203c (CELL_FACH), and 203d (CELL_DCH). LTE protocol UE connection states 204 include idle 205 and connected 206. The connection redirection, reselection, and handover procedures described elsewhere herein are shown here. Reselection is shown as an idle mode procedure in which either a UE in an LTE IDLE state 205 can be caused to reselect to an HSPA IDLE state 202, or vice versa. Similarly, handover is shown to be a connected mode procedure. A UE that is connected to an HSPA cell and in state 203d (CELL_DCH) can be caused to hand over to an LTE cell, entering LTE connected state 206, and vice versa.

Regarding redirection, the state diagram shows that URA_PCH 203a and CELL_PCH 203b and CELL_FACH 203c can be redirected to LTE IDLE 205. In certain cases, CELL_DCH 203d can also be redirected to LTE IDLE 205. Circuit-switched fallback (CSFB) involves a redirection from the LTE connected state 206 to the HSPA idle state 202. Some of the redirection methods described herein, such as release of existing LTE bearers at the loaded eNodeB, or redirections involving RRC connection release, may also be redirections from the LTE connected state 206 to the HSPA idle state 202.

In some cases, the network can trigger handover instead of the UE. These mechanisms are shown in the below figure in reference to the available radio resource control (RRC) states for 3G and 4G, and are used beneficially by the methods described below.

Figure 3:
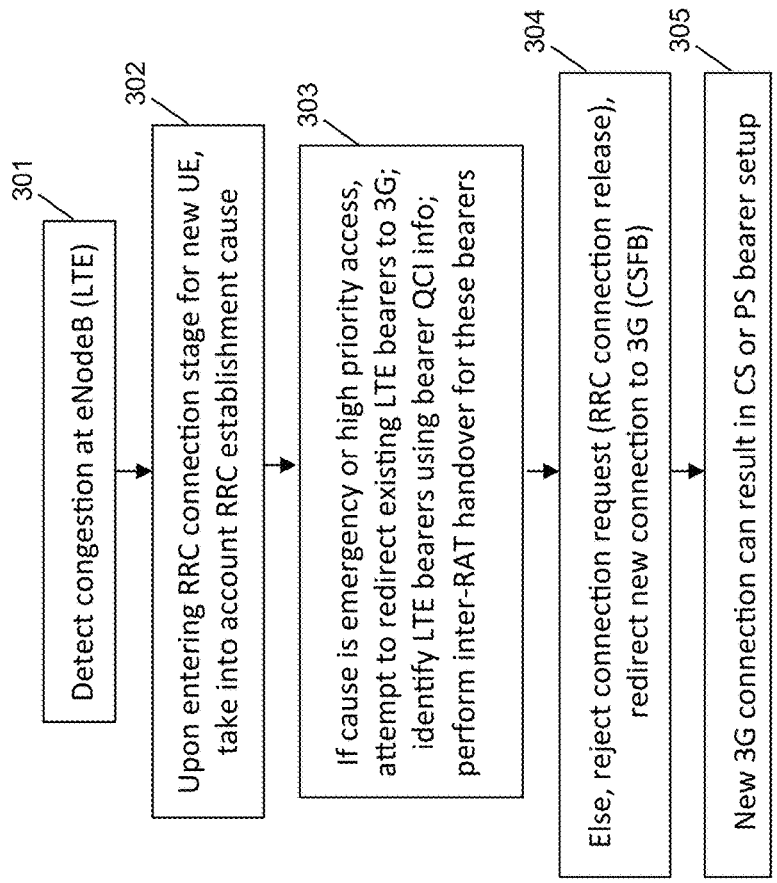
FIG. 3 is a flowchart showing a method for providing congestion relief at an eNodeB, in accordance with some embodiments.

FIG. 3 is a flowchart showing a method for providing congestion relief at an eNodeB, in accordance with some embodiments. At step 301, congestion is detected at an eNodeB. This may be detected at the eNodeB itself, or detected at another node, such as a gateway node or coordination server. Congestion may include one or more of: processor load; baseband load; resource load, resources including radio resource blocks; bandwidth or backhaul limitations; or other types of load. Congestion may be detected via various means. In some embodiments, measurement reports from UEs may be used. In some embodiments, measurement reports from UEs that are received by neighboring base stations may be used to identify load at a particular base station.

Once congestion has been detected, the methods described herein can be used to offload both new and existing connections so as to reduce congestion at the eNodeB. At step 302, the base station may begin managing its congestion by selectively admitting only certain connections. These connections may be filtered based on the radio resource control (RRC) establishment cause, which is a parameter transmitted by the UE to the base station in making its initial connection request. Upon entering the RRC connection stage for a new UE, the base station may identify and take into account the RRC establishment cause of that connection request as a factor in determining whether to accept the connection request.

At step 303, certain connection requests with certain establishment causes may be given preferred treatment by the base station. For example, emergency calls and/or emergency requests may be permitted to connect. As another example, high priority access, such as requests from operations and management nodes, may be granted access to connect. However, in the example shown, it may not be possible to accept a new connection given the loaded state of the base station. Therefore, redirection of existing LTE bearers to 3G may be performed.

LTE bearers to be redirected to 3G may be identified using bearer QCI information. Inter-RAT handover or redirection may be required of those bearers to a 3G cell, such as at a co-located 3G cell within the same base station of a multi-RAT base station as shown in FIG. 4.

In some embodiments, redirection of existing LTE bearers to 3G according to these methods may be performed even without new connection requests being received. For example, once load exceeds a threshold, the base station may perform redirection of existing LTE bearers to 3G to reduce load until it is again below the threshold.

Step 304 covers the case where an incoming attach request does not include an emergency or high priority access RRC establishment request. In such a case, the incoming request may be refused and instead redirected, using an RRC connection release. Step 305 makes clear that a circuit-switched request may be caused to fall back to a circuit-switched 3G context, and a packet-switched request may be caused to fall back to a packet-switched 3G PDP context.

In some cases, handovers may be required instead of redirections, such as when a CONNECTED-state circuit-switched context is required to be moved between RATs.

FIG. 4 is a schematic diagram of an enhanced eNodeB, in accordance with some embodiments. Enhanced eNodeB 400 may include processor 402, processor memory 404 in communication with the processor, baseband processor 406, and baseband processor memory 408 in communication with the baseband processor. Enhanced eNodeB 400 may also include first radio transceiver 410 and second radio transceiver 412, internal universal serial bus (USB) port 416, and subscriber information module card (SIM card) 418 coupled to USB port 414. In some embodiments, the second radio transceiver 412 itself may be coupled to USB port 416, and communications from the baseband processor may be passed through USB port 416.

A multi-RAT coordination module 430 may also be included, and may perform load monitoring of more than one RAT, including resource monitoring for both 3G and 4G RATs. The coordination module 430 may determine when to enter a congestion mode as described elsewhere herein, and may perform processing to determine which bearers or contexts should be redirected or reselected or handed over. The multi-RAT coordination module 430 may be in communication with a local evolved packet core (EPC) module 420, for authenticating users, storing and caching priority profile information, and performing other EPC-dependent functions when no backhaul link is available. Local EPC 420 may include local HSS 422, local MME 424, local SGW 426, and local PGW 428, as well as other modules. Local EPC 420 may incorporate these modules as software modules, processes, or containers. Local EPC 420 may alternatively incorporate these modules as a small number of monolithic software processes. Coordination module 430 and local EPC 420 may each run on processor 402 or on another processor, or may be located within another device.

Processor 402 and baseband processor 406 are in communication with one another. Processor 402 may perform routing functions, and may determine if/when a switch in network configuration is needed. Baseband processor 406 may generate and receive radio signals for both radio transceivers 410 and 412, based on instructions from processor 402. In some embodiments, processors 402 and 406 may be on the same physical logic board. In other embodiments, they may be on separate logic boards.

The first radio transceiver 410 may be a radio transceiver capable of providing LTE eNodeB functionality, and may be capable of higher power and multi-channel OFDMA. The second radio transceiver 412 may be a radio transceiver capable of providing LTE UE functionality. Both transceivers 410 and 412 are capable of receiving and transmitting on one or more LTE bands. In some embodiments, either or both of transceivers 410 and 412 may be capable of providing both LTE eNodeB and LTE UE functionality. Transceiver 410 may be coupled to processor 402 via a Peripheral Component Interconnect-Express (PCI-E) bus, and/or via a daughtercard. As transceiver 412 is for providing LTE UE functionality, in effect emulating a user equipment, it may be connected via the same or different PCI-E bus, or by a USB bus, and may also be coupled to SIM card 418.

SIM card 418 may provide information required for authenticating the simulated UE to the evolved packet core (EPC). When no access to an operator EPC is available, local EPC 420 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used, including mesh backhaul between mesh base stations or mesh relay nodes. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 410 and 412, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 402 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 410 and 412. Baseband processor 406 may use memory 408 to perform these tasks.

In some embodiments, the enhanced eNodeB 400 may include both 3G and LTE functionality, including nodeB and eNodeB functionality. The combination of both 3G and LTE functionality in the same base station allows for synergies in relation to the present application. For example, in some embodiments, shared memory, inter-process communication, or an internal network switch may be used to share load information between the 3G and 4G base stations. This may result in the 3G base station being able to inform the 4G base station that it is not heavily loaded and has voice bearer capacity to spare, or for the LTE base station to communicate in a lightweight way to the 3G base station that it is loaded without requiring specialized protocols for communicating, for example.

Figure 5:
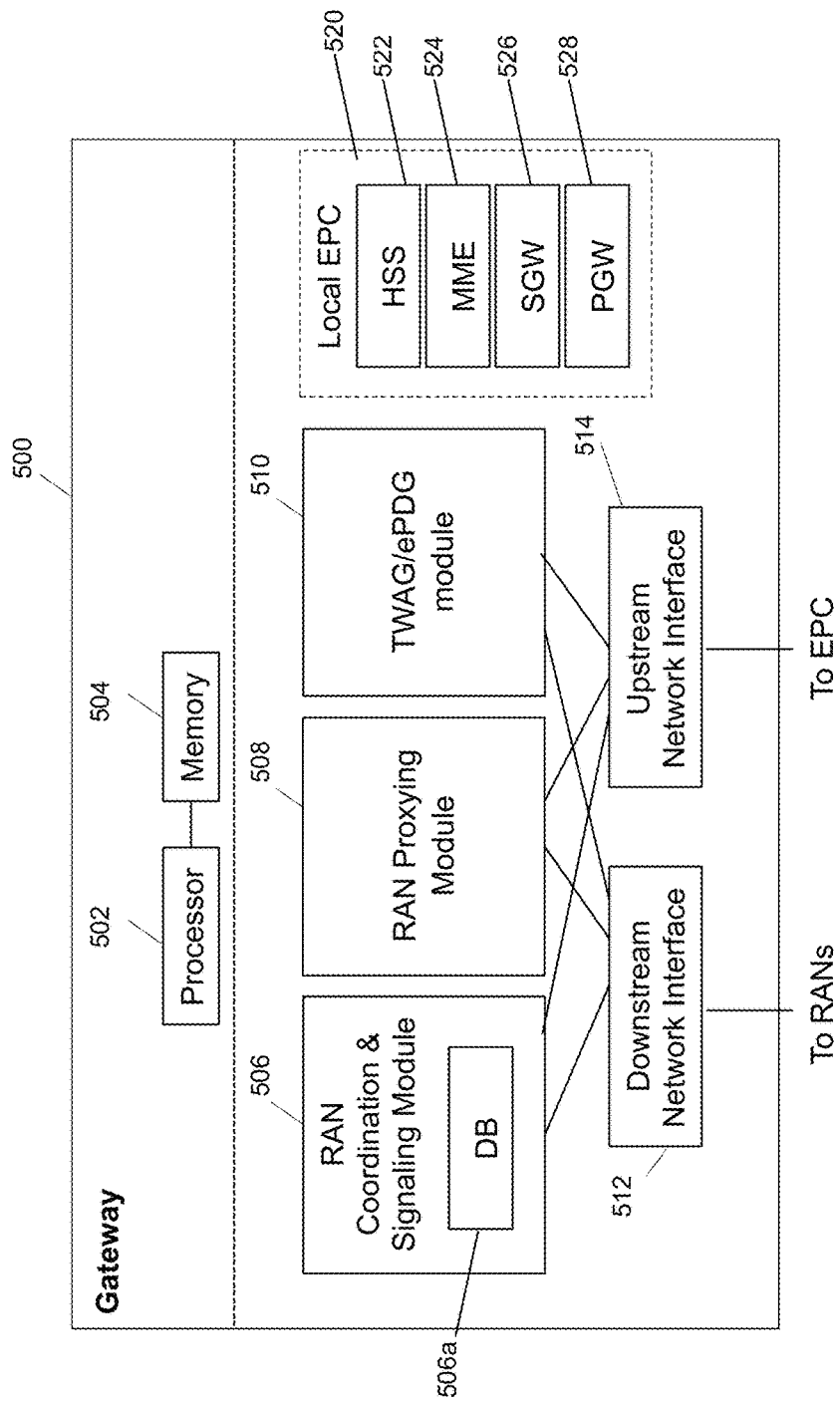
FIG. 5 is a schematic diagram of a gateway, in accordance with some embodiments.

FIG. 5 is a schematic diagram of a gateway, in accordance with some embodiments. Coordination server 500 includes processor 502 and memory 504, which are configured to provide the functions described herein. Also present are radio access network coordination/signaling (RAN Coordination and signaling) module 506, RAN proxying module 508, and routing virtualization module 510. In some embodiments, coordination server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet). Inter-RAT coordination functions such as those described herein may be coordinated or performed in module 506. For example, information about load from other base stations in the network may be forwarded to other nodes, thereby facilitating the methods described herein.

Coordination server 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In some embodiments, the radio transceivers described herein may be base stations compatible with a Long Term Evolution (LTE) radio transmission protocol or air interface. The LTE-compatible base stations may be eNodeBs. In the foregoing disclosure, the term 3G is used to refer to UMTS, HSPA, HSPA+, or CDMA/CDMA2000, as appropriate, and the term 4G is used interchangeably with LTE. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems. Wherever IMSI or IMEI are mentioned, other hardware, software, user or group identifiers, can be used in conjunction with the techniques described herein.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to Wi-Fi networks, networks in an unlicensed band, including 3GPP networks (LTE-U/LTE-AA), or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Accordingly, the disclosure of the present invention is intended to be illustrative of, but not limiting of, the scope of the invention, which is specified in the following claims.

The invention claimed is:

1. A method, comprising:
    detecting congestion at an eNodeB and entering a congestion control mode;
    receiving, at the eNodeB, a new user equipment (UE) connection request that contains a radio resource control (RRC) establishment cause;
    determining, at the eNodeB, a priority of the new UE connection request based on the RRC establishment cause, wherein the priority of the new UE connection request is based on a RRC establishment cause in the new UE connection request; and
    identifying, at the eNodeB, the congestion management strategy based on the priority of the new UE connection request, the congestion management strategy comprising both of-initiating a handover for an existing LTE bearer and redirecting the new UE connection request to a 3G nodeB.

2. The method of claim 1, wherein detecting congestion at the eNodeB is performed at the eNodeB.

3. The method of claim 1, wherein detecting congestion at the eNodeB is performed at a coordinating server.

4. The method of claim 1, wherein the eNodeB is a multi-radio access technology (multi-RAT) eNodeB with an integrated UMTS nodeB.

5. The method of claim 1, further comprising using a quality of service class identifier (QCI) of the existing LTE bearer to determine whether to evacuate the existing LTE bearer.

6. The method of claim 1, wherein the congestion management strategy comprises initiating a handover for an existing LTE bearer if the new UE connection request has an RRC establishment cause of either emergency or high priority access.

7. The method of claim 1, further comprising redirecting the new UE connection request that is a request for a packet-switched (PS) data connection to a 3G nodeB.

8. The method of claim 1, further comprising redirecting a mobile originating data connection request to a 3G nodeB.

9. The method of claim 1, further comprising identifying a plurality of LTE bearers to be handed over to 3G from lowest to highest QCI value.

10. The method of claim 1, further comprising exiting the congestion control mode once congestion at the eNodeB is resolved.

11. The method of claim 1, further comprising redirecting 3G connections back to the LTE eNodeB once congestion at the eNodeB is resolved.

12. The method of claim 1, further comprising detecting congestion by tracking one or more of: processor load; physical resource block (PRB) usage; physical downlink control channel control channel elements (PDCCH CCEs); number of total user equipments served; and backhaul bandwidth utilization.

13. The method of claim 1 wherein the RRC establishment cause is one of emergency; high priority access; mobile terminating access; mobile originating signaling; and mobile originating data.

14. A non-transitory digital storage medium comprising instructions that, when executed by a base station, causes the computer to perform steps comprising:
    detecting congestion at an eNodeB and entering a congestion control mode;
    receiving, at the eNodeB, a new user equipment (UE) connection request that contains a radio resource control (RRC) establishment cause, wherein the priority of the new UE connection request is based on a RRC establishment cause in the new UE connection request;
    determining, at the eNodeB, a priority of the new UE connection request; and
    identifying, at the eNodeB, the congestion management strategy based on the priority of the new UE connection request, the congestion management strategy comprising both of initiating a handover for an existing LTE bearer and redirecting the new UE connection request to a 3G nodeB.

15. The non-transitory digital storage medium of claim 14 wherein the RRC establishment cause is one of emergency; high priority access; mobile terminating access; mobile originating signaling; and mobile originating data.

* * * * *